H. E. TRIBETT.
ADJUSTING MEANS FOR CAR BRAKES.
APPLICATION FILED MAY 3, 1913.
1,094,274.  Patented Apr. 21, 1914.
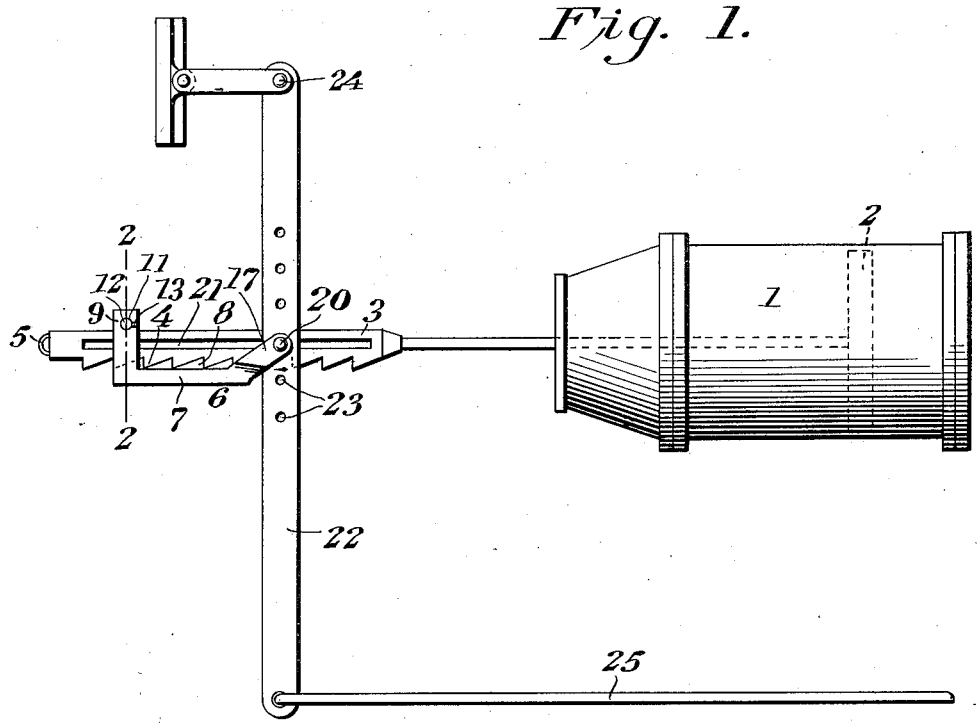
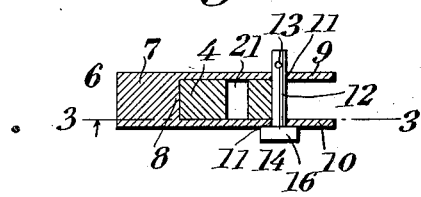
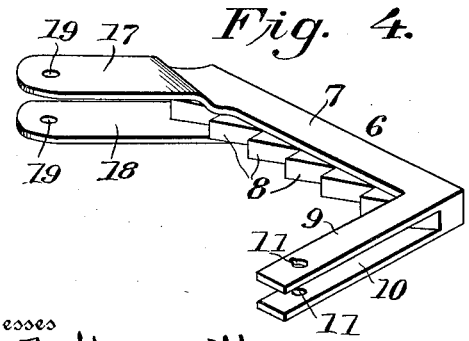
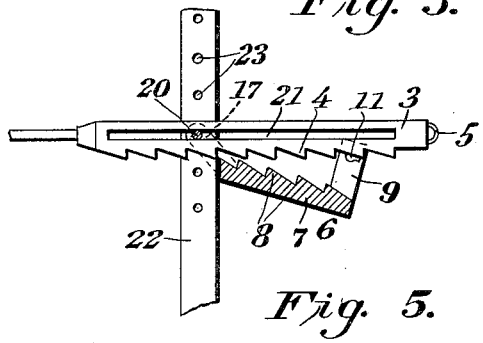
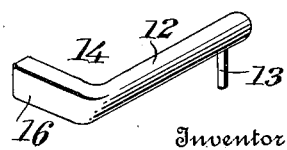
Inventor
H. E. Tribett
By Victor J. Evans
Attorney
Witnesses

UNITED STATES PATENT OFFICE.

HERBERT E. TRIBETT, OF CAMERON, WEST VIRGINIA.

ADJUSTING MEANS FOR CAR-BRAKES.

1,094,274.   Specification of Letters Patent.   Patented Apr. 21, 1914.

Application filed May 3, 1913.  Serial No. 765,300.

*To all whom it may concern:*

Be it known that I, HERBERT E. TRIBETT, a citizen of the United States, residing at Cameron, in the county of Marshall and State of West Virginia, have invented new and useful Improvements in Adjusting Means for Car-Brakes, of which the following is a specification.

The present invention relates to slack adjusting mechanism for car brakes and is designed to compel the brakes of the car to perform their full quota of work to secure from the brakes their highest efficiency without danger of flattening the wheels with which they engage.

The primary object of the invention is the provision of simple but effective means connected directly with the rod of the piston which works in the brake cylinder, of an air brake system, and which may be easily and quickly adjusted to regulate the throw of the cylinder lever, and as a consequence the force of contact or compression of the brake shoes, which are connected with the brake rod of the cylinder lever, against the treads of the wheels.

It is a still further object of my invention to provide the piston rod of the brake cylinder piston with a head to which is adjustably connected a clamp block that is pivotally secured to the cylinder lever, the connection between the block and the head of the rod being such as to permit of the block being adjusted longitudinally of the head without necessitating the entire removal of the block from the head or its disconnection from the cylinder lever.

With the above recited objects in view, and others which will appear as the nature of the invention is more fully understood, the improvement resides in the novel construction, combination and operative arrangement of parts set forth in the following specification and falling within the scope of the appended claims.

The essential features of the invention involved in carrying out the objects of the same, are necessarily susceptible of embodiment in various forms of construction without departing from the scope of the invention, and in the accompanying drawings I have illustrated a simple but satisfactory reduction of my improvement to practice.

In the drawings: Figure 1 is a fragmentary bottom plan view of a car equipped with an air brake system and illustrating my improvement in connection thereto, Fig. 2 is a sectional view upon the line 2—2 of Fig. 1, Fig. 3 is a horizontal sectional view upon the line 3—3 of Fig. 2, and illustrating the means of adjusting the clamping block upon the head of the piston rod, Fig. 4 is a perspective view of the clamp block, Fig. 5 is a perspective view of the key.

As the improvement is adapted for application to the piston rod of the piston of the brake cylinder of any ordinary air brake system, only the portions of the said system to which the improvement is directly connected have been shown in the drawings.

In the drawings, the numeral 1 designates a brake cylinder within which is arranged a piston 2 which, in the present instance is provided with a substantially rectangular elongated extension that is provided with a longitudinally extending slot, the said extension, will, hereinafter be referred to as the head 3 of the piston rod. The head 3 has one of its faces provided with a plurality of teeth 4, the said teeth being inclined toward the outer end of the head and terminating in shoulders which are arranged at a right angle to the head. The outer end of the head is provided with an eye 5, the same being adapted to receive the flexible connecting element of the hand brake rod, (not shown).

The numeral 6 designates the clamp block for the head 3. The block 6 includes a substantially rectangular body portion 7 which has its inner face provided with teeth 8 which are adapted to co-act with the teeth 4 of the head 3. The block is of a greatly lesser length than the head 3, and the said block is provided, adjacent what I will term its rear end, with spaced angular arms 9 and 10. These arms, 9 and 10, are of a length sufficient to project a suitable distance beyond the smooth longitudinal edge of the head 3, and the projecting portions of the arms are each provided with a key-hole slot 11, which are adapted to receive the shank 12 and bit 13 of a locking key 14. The key 14 is provided with an angular weighted head 16, which, when the key is passed through the key-hole slots and partially rotated therewithin, is adapted, by its weight, to retain the key locked upon the arm. The shank 12 of the key is adapted to engage with the smooth longitudinal edge of the head 3, so as to prevent the teeth of the clamp accidentally disengaging from the teeth of the head. The opposite or front end of the clamp block 7 is provided with integrally formed angularly arranged ears 17 and 18. These ears extend forwardly of the body of the clamp and are each provided with a registering opening 19 for the reception of a pivot pin 20 which also passes through the elongated slot 21 of the head 3. One of the ears, 19, has its end upset, that is spaced a suitable distance away from the face of the head which it overlies, to provide a sufficient space for the reception of the cylinder lever 22, between the said ear and the head. The lever 22 is provided with a plurality of spaced openings 23, through one of which passes the pivot 20. The lever 22 is pivoted, as at 24, to the frame work or to the body of the bottom of the car, and connected to the opposite end of said lever is a brake rod 25 which is connected with the brake shoe carrying beams (not shown).

From the above description, taken in connection with the drawings, it will be noted that the block 6 is normally securely associated with the head 3, and in order to adjust the said block to regulate the swing of the cylinder lever, and as a consequence the throw of the brake shoes, the key 14 is removed from the arms 9 and 10, and the block swung outwardly of the head upon its pivot 20 (see Fig. 3), when the said block may be readily adjusted with relation to the head without removing the block from the head or disconnecting the cylinder lever from the block and head. When the proper adjustment has been made the block is, of course, again locked, through the medium of its key, upon the head 3.

Having thus described the invention, what I claim is:

1. In a device of the class described, the combination of a brake cylinder, a piston within the cylinder and a rod for the piston, of a clamp block for the rod, a cylinder lever, and a brake rod connected with the lever, means for locking the clamp block upon the rod in longitudinal adjustment therewith, and means arranged between the block, the cylinder lever and the rod for permitting the adjustment of the block upon the rod without removing the block from its connection with the rod and with the cylinder lever.

2. In a device of the class described, the combination with a brake cylinder, a piston within the cylinder and a rod for the piston, said rod having a slotted head, of a clamp block arranged for longitudinal adjustment upon the head, a key for sustaining the clamp in locked position upon the head, a cylinder lever, a brake rod pivotally connected with the cylinder lever, and a pivot member passing through the slot of the head and connecting the cylinder lever with the clamp block.

3. In a device of the class described, the combination of a brake cylinder having a piston and being provided with a piston rod having an elongated head, said head being provided with a longitudinally extending slot and having one of its longitudinal edges toothed, a clamp block having teeth adapted to co-act with the teeth of the head, arms upon the clamp block passing over the opposite faces of the head, a key for the arms and engaging with the head, said block having angular ears which pass over the opposite faces of the head, a pivoted cylinder lever provided with a brake rod, and a pivot member for the ears of the clamp block engaging the cylinder lever and passing through the slot of the head.

4. In a device of the class described, an air brake cylinder having the rod of its piston provided with an elongated head having one of its sides toothed and being provided with an elongated slot, a clamp block, said block including a body portion having its inner face toothed, one of the ends of the block being provided with spaced arms arranged at an angle to the body and adapted to pass over the opposite faces of the head, said arms having each a key-hole slot, a key including a weighted head and having its shank provided with a bit adapted to pass through the slots of the arms to retain the teeth of the block in engagement with the teeth of the head, the said block having its opposite end formed with angular ears, a pivoted cylinder lever having a brake rod, and a pivot member passing through the ears, the cylinder lever and the slot of the head.

5. In a device of the class described, a piston rod for the piston of a brake cylinder having a slotted head, a clamp having angularly arranged ears overlying the opposite faces of the head, a cylinder lever provided with a brake rod, a pivot member for the ears and for the lever and passing through the slot of the head arms connected with the clamp, and a key member for the arms adapted to hold the clamp into frictional engagement with the head.

6. In a device of the class described, a piston rod of the piston of an air brake cylinder having a slotted head provided with teeth, a clamp block also provided with teeth and being connected with a cylinder lever that carries a brake rod, said block having an eccentrically arranged pivot which passes through the slot of the head to permit of the said block being swung to bring its teeth out of engagement with the teeth of the head, and means carried by the block and adapted to engage with the head for locking the block immovably upon the head.

In testimony whereof I affix my signature in presence of two witnesses.

HERBERT E. TRIBETT.

Witnesses:
WM. J. KOERTH,
BENNETT S. JONES.

Copies of this patent may be obtained for five cents each, by addressing the "Commissioner of Patents, Washington, D. C."